United States Patent [19]

Porter

[11] Patent Number: 4,952,217
[45] Date of Patent: Aug. 28, 1990

[54] FIRE KINDLER

[75] Inventor: Jerry Porter, Charlottesville, Va.

[73] Assignee: John S. Fisher, Raleigh, N.C.; a part interest

[21] Appl. No.: 462,629

[22] Filed: Jan. 9, 1990

[51] Int. Cl.$^5$ ............................................. C10L 11/06
[52] U.S. Cl. ...................................... 44/532; 44/522; 44/14
[58] Field of Search .................... 44/532, 520, 521, 14, 44/522

[56] References Cited

U.S. PATENT DOCUMENTS

| | | | |
|---|---|---|---|
| 6,246 | 1/1875 | Husbands, Jr. | 44/532 |
| D. 34,850 | 5/1901 | Pollard | 44/520 |
| 182,087 | 9/1876 | Tylee | 44/532 |
| 196,596 | 10/1877 | Reed | 44/532 |
| 197,188 | 11/1877 | Wagner | 44/532 |
| 198,562 | 12/1877 | Boda | 44/532 |
| 199,184 | 1/1878 | Case | 44/532 |
| 201,045 | 3/1878 | Prentice | 44/532 |
| 201,184 | 3/1878 | Lewis | 44/532 |
| 211,085 | 1/1879 | Burnett | 44/532 |
| 213,768 | 4/1879 | McShane | 44/532 |
| D. 245,257 | 8/1977 | Taylor | 23/90.1 |
| 248,849 | 11/1881 | Eddy | 44/532 |
| 286,103 | 10/1883 | Wood et al. | 44/532 |
| 518,247 | 4/1894 | Hutchinson . | |
| 585,001 | 6/1897 | MacDonald . | |
| 694,027 | 2/1902 | Pollard | 44/532 |
| 2,578,998 | 12/1951 | Fracheboud | 44/38 |
| 3,279,900 | 10/1966 | Naples | 44/40 |
| 3,988,121 | 10/1976 | Leveskis | 44/41 |
| 4,627,854 | 12/1986 | Pratt | 44/40 |

FOREIGN PATENT DOCUMENTS

| | | | |
|---|---|---|---|
| 7261 | of 1884 | United Kingdom | 44/520 |
| 15234 | of 1885 | United Kingdom | 44/532 |
| 9857 | of 1896 | United Kingdom | 44/14 |
| 2599 | of 1905 | United Kingdom | 44/532 |
| 22672 | of 1912 | United Kingdom | 44/520 |

*Primary Examiner*—Carl F. Dees
*Attorney, Agent, or Firm*—Richard E. Jenkins

[57] ABSTRACT

A fire kindler particularly adapted for ease of ignition and complete combustion so as to render the initiation of a log fire in a fireplace a quick and easy task. The fire kindler comprises a combustible block having a generally V-shaped aperture therethrough and at least one slot extending across the top of the combustible block and downwardly into the block so as to be in fluid communication with the V-shaped aperture.

12 Claims, 2 Drawing Sheets

FIRE KINDLER

TECHNICAL FIELD

The present invention relates to a fire kindler for igniting a log fire in a fireplace. More particularly, the present invention provides an improved fire kindler which is easily ignited with a single match and burns completely when ignited so as to serve as an easy-to-use fire kindler or initiator to ensure the kindling of fireplace logs or the like once ignited by the user.

BACKGROUND ART

As is well known to those familiar with burning logs in a home fireplace or the like, it is usually a difficult task to assure ignition of the logs through the use of kindling wood, paper, and similar fire initiators. Typically, to start a log fire in a fireplace is a tedious task requiring the repetitive ignition of kindling wood or paper before a continuous and stable log fire is achieved. In fact, the effort required and the frustration associated with building a log fire in a fireplace tend to dampen the enthusiasm of many from attempting to do so on a regular basis during the winter months.

In the past, many efforts have been made to solve this problem with a variety of combustible fire kindler products which are provided with slots and/or apertures therein in an effort to assure an easy-to-ignite fire kindler product. For example, U.S. Pat. No. 213,768 discloses a fire kindler block formed from pulverized coal, sawdust, rosin, and the like which is saturated with a small amount of petroleum. The block includes a plurality of interconnecting channels extending therethrough as well as a match inserted at the top thereof by which the block is initially ignited. U.S. Pat. No. 6,246, U.S. Pat. No. 199,184, and U.S. Pat. No. 201,184 also all disclose various embodiments of fire kindler products made from wood or similar material which include varying configurations of slots or channels therein to serve as draft flues in order to facilitate complete combustion of the fire kindler product. However, none of these products is believed to have been successful or to have provided a widely-used fire kindler product for use in initiating log fires in a fireplace. Applicant has overcome the shortcomings of the prior art fire kindler products and developed a novel fire kindler which due to its unique structural features is easy to ignite and burns vigorously until fully combusted in order to provide superior ignition of fireplace logs.

DISCLOSURE OF THE INVENTION

In accordance with the present invention, applicant provides a fire kindler designed specifically for ease of ignition and complete combustion comprising a block of a combustible material having a generally V-shaped aperture therethrough which extends between opposing sides of the block and which defines a V-shaped portion of combustible material between the upwardly extending sides thereof. At least one slot extends across the top of the block and downwardly into fluid communication with the V-shaped aperture. Thus, the fire kindler block may be easily ignited by placing a match or the like into the bottom of the V-shaped aperture therein in order to ignite the bottom tip of the V-shaped portion of combustible material.

It is therefore an object of the present invention to provide a fire kindler which is uniquely easy to ignite and which once ignited will burn completely until fully combusted.

It is another object of the present invention to provide an improved fire kindler which is inexpensive to fabricate and which due to its unique configuration can be ignited with a single match in order to provide a heretofore unachievable ease of starting a log fire in a fireplace.

Some of the objects of the invention having been stated, other objects will become evident as the description proceeds, when taken in connection with the accompanying drawings.

BEST MODE FOR CARRYING OUT THE INVENTION

Figure 1:
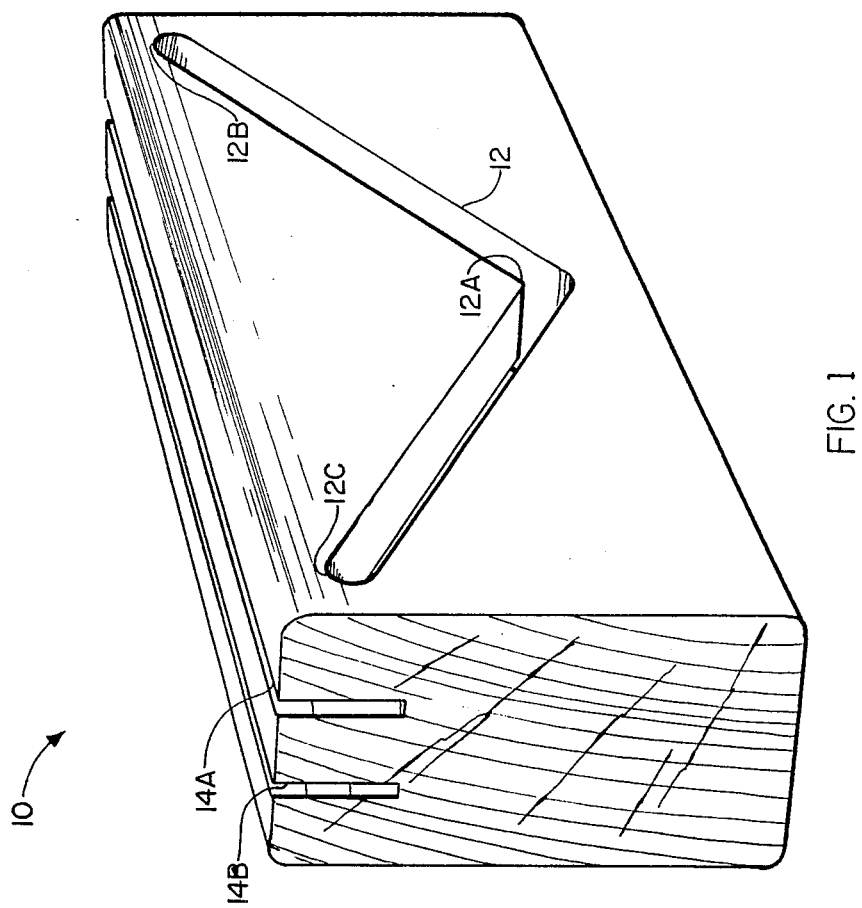
FIG. 1 is a perspective view of a fire kindler made in accordance with the present invention.
Figure 2:
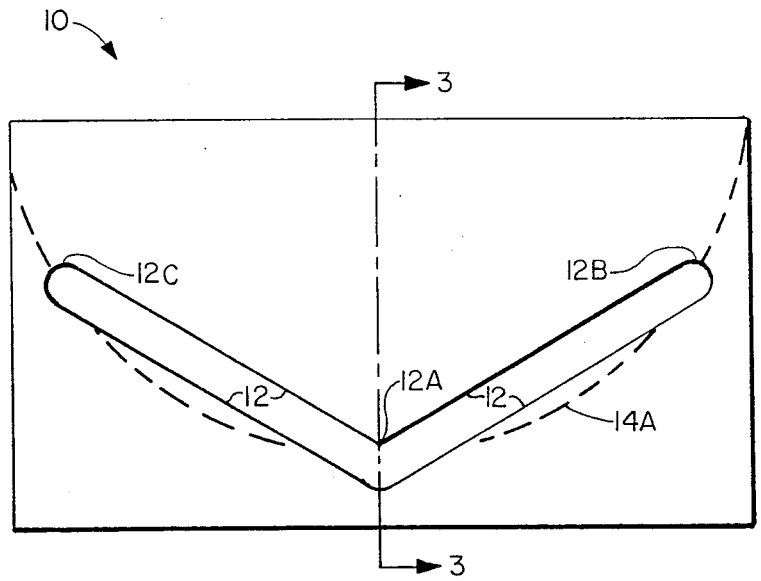
FIG. 2 is a side elevation view of a fire kindler made in accordance with the present invention.
Figure 3:
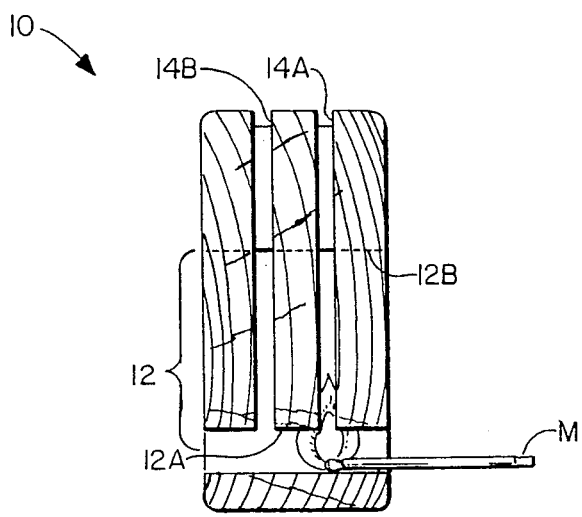
FIG. 3 is a vertical cross-sectional view of the fire kindler taken along the lines 3—3 in FIG. 2.

Referring now to FIGS. 1-3 of the drawings, a fire kindler 10 constructed in accordance with the present invention is shown. Fire kindler 10 has a V-shaped aperture 12 provided therein which extends through the entire block. V-shaped aperture 12 has two generally upwardly extending arms which define a V-shape having a bottom portion 12A and which terminate in two top end portions, 12B and 12C. With particular reference to FIGS. 2 and 3, it can be further appreciated that fire kindler 10 further includes a pair of slots, 14A and 14B, across the top surface thereof which extend downwardly into the block and into fluid communication with V-shaped aperture 12. Although other cuts are contemplated by the invention, most suitably V-shaped slots 14A and 14B are circularly cut slots (see FIG. 2).

Most suitably, combustible fire kindler 10 is a rectangular pine wood block about 7 inches long and 1.5 inches in width. V-shaped aperture 12 extends through block 10 perpendicularly to the longitudinal axis of the block and defines an angle between about 30°–120°, most suitably about 120°. The width of V-shaped aperture 12 is most suitably about ⅜ inches. Slots 14A, 14B extend parallel to the longitudinal axis of fire kindler 10 and are cut inwardly into the block to a depth of about 2.5 inches at the lowermost point thereof.

In operation, a single match M is placed into the bottom portion 12A of V-shaped aperture 12 (see FIG. 3) for several seconds until the bottom tip of the V-shaped portion of combustible material located between the upwardly extending sides of V-shaped aperture 12 is ignited. Once ignited, the tip will continue to burn due to the unique shape of the V-shaped portion of combustible material located between the sides of aperture 12 and the draft flue provided by aperture 12 and slots 14A and 14B. In order to start a typical log fire in a fireplace, a single match will serve to ignite fire kindler 10 which will continuously and completely burn until fully combusted and thereby serve to ignite the wood logs under which it has been positioned.

It will thus be seen that there has been described above a fire kindler which enables an unskilled person to easily start a log fire in a fireplace without the need for paper, petroleum products, or special tools and which is a naturally combustible product with no associated petroleum fumes or the like. Although the fire kindler is particularly well-adapted for starting a log fire in a fireplace, it is contemplated that it can also be used as a fire starter for a stove, campfire, or charcoal grill.

It will be understood that various details of the invention may be changed without departing from the scope of the invention. Furthermore, the foregoing description is for the purpose of illustration only, and not for the purpose of limitation—the invention being defined by the claims.

What is claimed is:

1. A fire kindler comprising a block formed from a single element of combustible material having a generally V-shaped aperture therethrough which extends between two opposing sides of said block and defines a V-shaped portion of combustible material between the upwardly extending sides thereof, and at least one slot extending across the top of said block and downwardly into said V-shaped aperture therethrough, said V-shaped portion of combustible material comprising a bottom tip which is easily ignited, whereby said fire kindler block may be easily ignited by placing a match or the like adjacent the bottom of the V-shaped aperture so as to ignite the bottom tip of the V-shaped portion of combustible material.

2. A fire kindler according to claim 1 wherein said block comprises a rectangular block and said V-shaped aperture extends perpendicularly to the longitudinal axis of said block and said at least one slot extends parallel to the longitudinal axis of said block.

3. A fire kindler according to claim 2 wherein said V-shaped aperture defines an angle between about 30°–120°.

4. A fire kindler according to claim 3 wherein said angle is about 120°.

5. A fire kindler according to claim 2 wherein said at least one slot comprises two parallel slots.

6. A fire kindler according to claim 5 wherein said two parallel slots are circular slots.

7. A fire kindler according to claim 1 wherein said combustible block is a wood block.

8. A fire kindler comprising a rectangular block formed from a single element of a combustible material having a generally V-shaped aperture therethrough extending between two opposing sides and in a direction generally perpendicular to the longitudinal axis of said block, said V-shaped aperture defining a V-shaped portion of combustible material between the upwardly extending arms thereof, and at least one slot extending across the top of said block and downwardly into said V-shaped aperture therethrough, said V-shaped portion of combustible material comprising a bottom tip which is easily ignited, whereby said fire kindler block may be easily ignited by placing a match or the like adjacent the bottom of the V-shaped aperture so as to ignite the bottom tip of the V-shaped portion of combustible material.

9. A fire kindler according to claim 8 wherein said V-shaped aperture defines an angle between about 30°–120°.

10. A fire kindler according to claim 9 wherein said angle is about 120°.

11. A fire kindler according to claim 8 wherein said at least one slot comprises two parallel circular slots.

12. A fire kindler according to claim 8 wherein said combustible block is a wood block.

* * * * *